Oct. 6, 1959  R. B. WATROUS  2,907,338
CONTROLLER SPAN ADJUSTING APPARATUS
Filed March 14, 1957

*INVENTOR.*
ROBERT WATROUS
BY Arthur N. Swanson
ATTORNEY.

United States Patent Office 2,907,338
Patented Oct. 6, 1959

2,907,338

CONTROLLER SPAN ADJUSTING APPARATUS

Robert B. Watrous, Philadelphia, Pa., assignor to Minneapolis-Honeywell Regulator Company, Minneapolis, Minn., a corporation of Delaware Application March 14, 1957, Serial No. 645,968

8 Claims. (Cl. 137—85)

The general object of the present invention is to provide a force balanced instrument with a deflectable circular plate member that is useful in adjusting the span of such an instrument.

A more specific object of the present invention is to provide an annular guide for a control instrument in and along which a pivot for a force balance circular plate or disc may be rotated to change the span of the instrument.

A still more specific object of the present invention is to provide a guide along which a pivot of a span adjusting rotatable disc means may be displaced so as to change the force ratio that is existing between two opposing forces acting on the disc.

Another more specific object of the present invention is to make use of a span adjusting rotatable disc means in a differential pressure measuring apparatus so that the relationship between a differential pressure being sensed by such an apparatus and the output air pressure being produced by this measuring apparatus can be altered by simply displacing a disc pivot along an annular guide.

Figure 1:
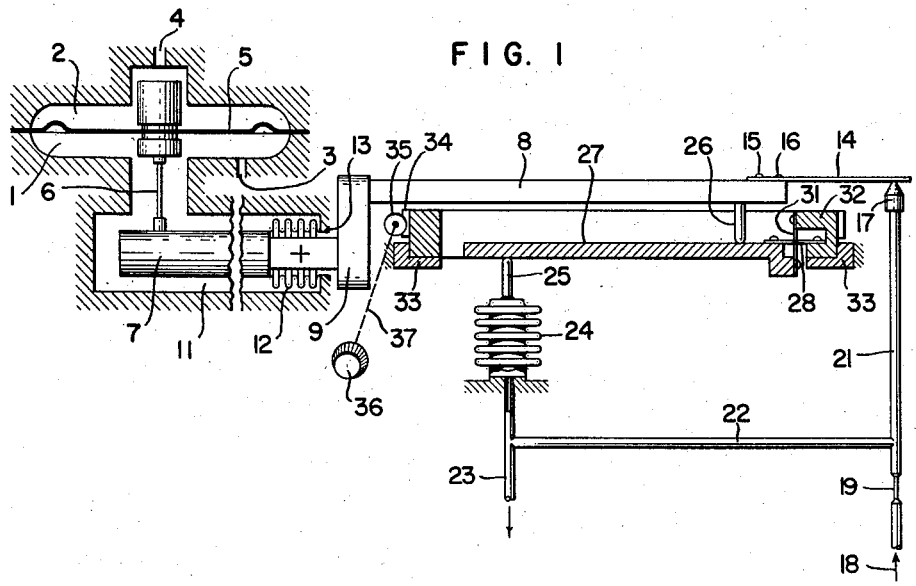
Figure 2:
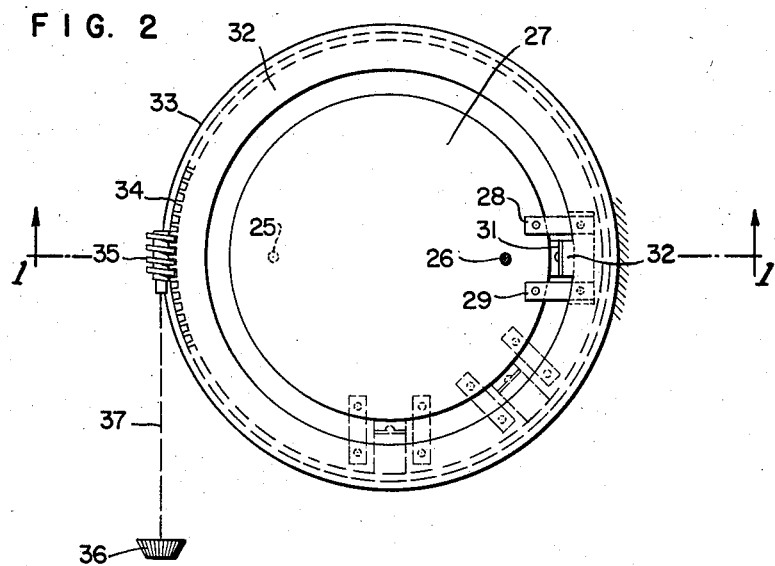

Fig. 1 shows a cross sectional view taken along the section line 1—1 of Fig. 2 and wherein the span adjusting rotatable disc being used to adjust the span of a differential pressure measuring apparatus, and Fig. 2 shows a plan view of the span adjusting rotatable disc shown in Fig. 1.

By way of an example, I have illustrated in Fig. 1 the span adjusting rotatable disc set forth in this application as being used as a substitute for the span adjusting means now in commercial use in differential pressure measuring types of apparatus and in transmitting types of apparatus which are respectively disclosed in the pending applications for patent of Booth, Du Bois, and West, Serial No. 248,358 filed September 6, 1951, now United States Patent No. 2,808,725, issued October 8, 1957, and in the Pneumatic Temperature Transmitter Controller disclosed in the pending application of Conrad H. Stokes and Robert C. Whitehead, Jr., Serial No. 347,812, filed April 9, 1953, now United States Patent No. 2,823,688, issued February 18, 1958.

This differential pressure measuring apparatus is comprised of a high pressure chamber 1, a low pressure chamber 2, a conduit 3 for transmitting a first fluid pressure of one magnitude to the high pressure chamber 1, and a conduit 4 for transmitting a second fluid pressure of a second magnitude to the low pressure chamber 2. This differential pressure measuring apparatus is also comprised of a diaphragm 5 for separating the pressure in chamber 1 from the pressure in chamber 2, a flexible vertical rod 6 having its upper end secured to the central portion of the diaphragm 5 and having its lower end connected to a horizontal beam section 7 that is parallel to the beam 8 and rigidly connected to the latter by an elbow element 9. The parts 6 and 7 are shown located in an elbow-shaped extension 11 of the chamber 1. The end of the chamber extension 11 nearest the beam section 8 is sealed by an elongated bellows 12 which loosely surrounds the right hand end portion of the beam section 7 and whose left end is welded or otherwise attached to the beam 7. The other end of the bellows 12 has a radial disc-like extension 13 which is welded or otherwise attached to the end of the wall surrounding the horizontal portion of the beam 7.

The right end of the beam section 8 of the aforementioned differential pressure measuring and transmitting apparatus is connected to a flapper 14 by suitable connecting means such as by the rivets 15, 16. Immediately below the right end of this flapper 14 there is shown a bleed nozzle 17. A regulated fluid supply pressure flowing from a source not shown is employed to transmit a constant fluid supply in a direction of the arrow 18 through a restriction 19 to fluid pressure chamber 21 that forms a part of and is connected at its upper end to the nozzle 17.

The aforementioned differential pressure measuring and transmitting apparatus also employs a conduit 22 to connect the nozzle chamber 21 with an output control pressure transmitting conduit 23. This conduit has also been used to connect this nozzle chamber 21 to the feedback bellows 24 having a vertical thrust member 25 fixedly connected for movement with its upper end. On the opposite side and at the other end of the beam 8 there is shown an input force member 26 fixedly attached thereto which has its unattached lower end in contact with a span adjusting disc 27. The right end portion of this disc 27 is shown in Figs. 1 and 2 as being pivotally connected by way of a flexible pivot, having three thin flexible metal plates 28, 29, 31 to the pivot member 32. The pivot member 32 is shown in Fig. 1 of the drawing as having its lower surface in contact with the upper surface of an L-shaped stationary guide member 33.

Integrally mounted on the upper outer peripheral surface of the pivot member 32 there is shown gear teeth 34. These gear teeth 34 extend around the entire outer peripheral surface of the pivot member 32 and are shown in engagement with a worm 35. A suitable worm rotating means for example the knob 36 and the shaft 37 is schematically shown in Fig. 1 of the drawing.

In Fig. 2 of the drawing there is shown a dotted line configuration two selected positions to which the pivot member 32 and its flexible pivots 28, 29, 31 may be rotated. The first of these selected dotted line pivot member positions is shown displaced forty-five degrees in a counter-clockwise direction from the solid line pivot position, and the second of these selected positions shows the pivot member displaced ninety degrees in a clockwise direction from the solid line pivot position.

It can be seen from the aforementioned description that rotation of the knob 36 in one direction will cause the span adjusting disc 27 to be rotated in a clockwise direction to either of the aforementioned selected pivot positions, while the rotation of the knob 36 in the opposite direction will cause the disc 27 and pivot 28, 29, 31 and pivot member 32 to be moved in a counter-clockwise direction along the guide member 33.

While the flexible pivot 28, 29, 31 and the pivot member 32 is in a solid line position shown in the drawing, the moment arm about which the input force member 26 is acting on the disc 27 will be the perpendicular distance that exists between a line passing through the center line of the pivot, which line is normal to the line about which the pivot is being used, and the aforementioned input force member 26. In a similar manner, the moment arm about which the rebalancing force member 25 is acting on the disc 27 will be the perpendicular distance existing between a line passing through the center line of the pivot, which line is normal to the line about which the pivot is being moved, and the aforementioned input force member 26. It can thus be seen that when the pivot is in the solid line position as that shown in Fig. 2, there is a certain ratio between the input force acting on the input force member 26 to rotate the disc 27 in a counterclockwise direction about its pivot and the rebalancing force acting on the rebalancing force member 25 to rotate the disc 27 in a clockwise direction about its pivot.

When the disc 27 and its associated flexible strips 28, 29, 30 and pivot member 32 is rotated in the manner described supra to the selected dotted line position that is displaced forty-five degrees in a clockwise direction from a solid line position, it is evident that the aforementioned moment arm about which the input force member 26 is acting on disc 27 will now be increased due to the fact that the previously mentioned perpendicular distance referred to that exists between the pivot and the input force member 26 has now been increased. In a similar but reversed manner it can be seen that the previously mentioned perpendicular distance which was referred to that existed between the pivot and the rebalancing force member 25 has now been decreased. The moment arm about which the rebalancing force member 25 is acting on the disc 27 will thus be decreased as the pivot is rotated into the aforementioned first dotted line pivot position. It can further be seen that the force ratio that exists between the force applied by the input member 26 and the force applied by the rebalancing force member 25 will be increased. Furthermore, it will be noted that less force need be applied by the input force member 25 in order to deflect the disc 27 when in this first dotted line pivot position. The flapper 14 will thus be permitted to move closer to the face of the nozzle 17 for any given differential pressure force applied to the beam than it was previously possible to do when the pivot was in a solid line position. It is therefore possible, when the pivot of the span adjusting disc is in this number one dotted line position to produce an increase in the pressure of the fluid in the chamber 21 and the magnitude of the pressure being transmitted through the output control pressure conduit 23 to a level that is greater than it was possible to produce when the pivot was in a solid line position.

When the disc and its associated flexure strips 28, 29, and 30 and pivot member 32 has been rotated in the second dotted line position shown in Fig. 2 or a position in which the pivot has been displaced in a ninety degree clockwise fashion from its solid line position, it will be evident that the aforementioned perpendicular distance then existing between the pivot and each of the force members 25, 26 will be equal. In the second dotted line position, a one to one force ratio will thus be present between the forces being applied by the input member 26 and the rebalancing member 25.

Any further clockwise disc displacement from the number two dotted line position toward the member 25 will tend to increase the moment arm distance between the pivot and the input force member 26 while at the same time decreasing the moment arm existing between the pivot and the rebalancing force member 25. It can thus be seen that the ratio of forces existing between the input force member 26 and the rebalancing force member 25 as the pivot is rotated from the second dotted line position towards the member 25 will be increased.

It is obvious that during ninety degrees of clockwise rotation of the pivot 28, 29, 31, and pivot member 32 beyond member 25 will once again bring the force ratio existing between members 26 and 25 back to a one to one ratio and still another ninety degrees of clockwise motion will bring the pivot back to the solid line position shown in Fig. 2.

It is thus evident that the present invention provides a rotatable span adjusting disc which, upon rotation to a selected position, will adjust the force ratio that exists between two forces acting on the beam to a value that will enable a flapper 14 to be moved closer or further away from the nozzle 17 of a bleed valve. It is further evident from the aforementioned remarks that such a span adjusting disc 27 will enable the magnitude of a control pressure produced by such a bleed valve to be raised or lowered for a given input force applied to the disc. Furthermore, the rotation of the aforementioned pivot 28, 29, 31, 32 of the span adjusting disc 27 from one position to another will enable the operator to increase or decrease the magnitude of the feedback force that must be overcome by an input force being applied to the disc by a flapper beam in order that a predetermined tilt of the beam may be effected by such an input force.

What is claimed is:

1. In a force balance instrument responsive to the value of a measured condition, in combination, an annular guide, a flexible pivot means having a stationary portion in sliding engagement with said guide, a rotatable disc pivotally mounted on said guide, a first input force member acting on said disc to tilt same in accordance with the value of said measured condition, a second force member spaced from said first member and acting on said disc in a direction opposite to the direction that said first force member is acting on said disc and mechanical means operably connected to said pivot to change the position of said pivot in said guide.

2. A substantially horizontal circular plate, a flexible pivot having a deflectable portion attached to a peripheral portion of said plate, a stationary annular guide member surrounding and spaced from the peripheral surface of said plate in which a non-deflecting portion of said pivot is slidably and rotatably mounted, stationary control elements operably connected to opposite ends of said plate and subjecting said plate to opposing forces adapted to longitudinally tilt said plate about said flexible pivot and a mechanical means operably connected to said non-deflecting portion to move said flexible pivot along said annular guide member to effect a change in the force relationship between said forces being applied to said plate by said control elements.

3. A means for adjusting the span of a force balance apparatus comprising, a guide member, a tilting plate slidably connected by means of a pivot fixedly attached thereto to a portion of its periphery to said member and mechanically actuated means operably connected to said pivot for slidably moving said pivot and said tilting plate attached thereto along said guide member.

4. A means for adjusting the span of a force balance apparatus comprising a tilting plate onto which an input force of one magnitude and a rebalancing force of another magnitude is applied, a guide ring means spaced from the outer peripheral portion of said plate, a flexible pivot mounted in said guide ring means and pivotally connected to an outer elongated portion of said tilting plate and a mechanical means connected to said pivot for increasing the distance between the pivot and the vertical plane in which one of said forces is acting on said plate while the distance between said pivot and the vertical plane in which the other of said forces is acting on the plate is decreased.

5. A span adjusting means for a force balance differential pressure measuring apparatus comprising, a beam operably arranged to apply a vertical downward force to a pivoted mounted plate and to a flapper element mounted on one end of said beam in accordance with the magnitude of a variable, a stationary nozzle for discharging a fluid jet against said flapper element, expandable rebalancing means to apply a vertically upward force on said plate in accordance with the magnitude of the fluid jet flowing from the interior of said nozzle and guide means along which said plates may be moved to change the location of the pivot mounting of said plate with respect to said forces acting on said plate.

6. A means to adjust the force ratio between two forces acting on a pivoted plate member comprising, a guide, a pivot having a first portion slidably connected to said guide and having a second portion fixedly connected to an outer end portion of said plate and means operably connected to said first portion of said pivot to move said pivot along said guide in a path that will increase the length of the moment arm about which one of said forces is acting on said plate while the length of the moment arm about which said other force is acting on said plate is being decreased.

7. A means for adjusting the span of a force balance apparatus comprising, a stationary annular member, a tilting plate positioned for movement within said member, said tilting plate being slidably connected by means of a pivot fixedly attached to a portion of the periphery of said tilting plate to said annular member and mechanically operated means operably connected to said pivot for slidably mounting said pivot and said plate attached thereto along said guide member.

8. A span adjusting apparatus for changing the force relationship between two elements applying opposing forces of varying magnitude to the opposite flat surfaces of a disc comprising, a pivot connection fixedly attached to an outer peripheral portion of said disc and a stationary annular guide member and means operably associated with said pivot connection to move said pivot along said guide member.

References Cited in the file of this patent

UNITED STATES PATENTS

| | | |
|---|---|---|
| 2,285,540 | Stein | June 9, 1942 |
| 2,675,818 | Gallo | Apr. 20, 1954 |
| 2,742,917 | Bowditch | Apr. 24, 1956 |
| 2,749,927 | Grogan | June 12, 1956 |